United States Patent
Hamel et al.

(10) Patent No.: US 11,658,980 B2
(45) Date of Patent: *May 23, 2023

(54) CLOUD PLATFORM ACCESS SYSTEM

(71) Applicant: Workday, Inc., Pleasanton, CA (US)

(72) Inventors: Bjorn Hamel, Dublin, CA (US); Dylan Owen, Oakland, CA (US); Jonathan David Ruggiero, Danville, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,515

(22) Filed: Sep. 8, 2021

(65) Prior Publication Data

US 2021/0409415 A1  Dec. 30, 2021

Related U.S. Application Data

(63) Continuation of application No. 16/177,233, filed on Oct. 31, 2018, now Pat. No. 11,140,169.

(51) Int. Cl.
*H04L 9/40* (2022.01)

(52) U.S. Cl.
CPC .......... *H04L 63/102* (2013.01); *H04L 63/068* (2013.01); *H04L 63/083* (2013.01); *H04L 63/0823* (2013.01)

(58) Field of Classification Search
USPC .................................................. 726/7, 4, 2
See application file for complete search history.

(56) References Cited

U.S. PATENT DOCUMENTS

| | | | | |
|---|---|---|---|---|
| 7,788,716 B2* | 8/2010 | Dapkus | ................. | H04L 69/329 726/19 |
| 9,118,653 B2* | 8/2015 | Nimashakavi | ........ | G06F 21/335 |
| 9,602,482 B1* | 3/2017 | Roth | ..................... | H04L 63/107 |
| 9,699,180 B2 | 7/2017 | Wetter | | |
| 10,057,246 B1* | 8/2018 | Drozd | .................... | G06F 21/335 |
| 10,382,213 B1* | 8/2019 | Rafn | .................... | H04L 9/3268 |
| 10,505,916 B2* | 12/2019 | Engan | ................. | H04L 63/0272 |
| 10,757,089 B1* | 8/2020 | Hohler | ................ | H04L 63/0807 |
| 10,880,287 B2* | 12/2020 | Gruskin | ................. | H04L 67/53 |
| 10,891,616 B2* | 1/2021 | Rome | .................. | G06K 7/1417 |
| 10,904,074 B2* | 1/2021 | Wilson | .................... | G06F 21/50 |
| 2007/0157309 A1* | 7/2007 | Bin | ........................ | H04L 63/08 713/181 |

(Continued)

*Primary Examiner* — Amare F Tabor
*Assistant Examiner* — Mahabub S Ahmed
(74) *Attorney, Agent, or Firm* — Van Pelt, Yi & James LLP

(57) ABSTRACT

A system includes an interface and a processor. The interface is configured to receive, at an application routing platform, an API call for an application platform comprising a signed tenant token. The processor is configured to determine that the signed tenant token is valid; determine an application platform token for the application platform; associate a root certificate with the application platform token; determine routing information to the application platform based at least in part on the API call; and provide the application platform the API call and the application platform token using the routing information to enable access to the application platform, wherein the application platform determines whether the application platform token is valid using the root certificate and executes the API call in response to a determination that the application platform token is valid.

20 Claims, 10 Drawing Sheets

(56) References Cited

U.S. PATENT DOCUMENTS

| | | | |
|---|---|---|---|
| 2009/0235349 A1* | 9/2009 | Lai | H04L 9/3271 726/10 |
| 2010/0125612 A1* | 5/2010 | Amradkar | H04L 63/105 707/E17.014 |
| 2010/0198730 A1* | 8/2010 | Ahmed | G06F 21/30 380/278 |
| 2013/0024919 A1* | 1/2013 | Wetter | G06F 21/335 726/6 |
| 2013/0042115 A1* | 2/2013 | Sweet | G06F 21/577 713/176 |
| 2013/0086210 A1* | 4/2013 | Yiu | H04L 63/0807 709/217 |
| 2013/0191882 A1* | 7/2013 | Jolfaei | H04L 63/10 726/4 |
| 2013/0198236 A1* | 8/2013 | Lissack | G06F 21/6218 707/783 |
| 2014/0013409 A1* | 1/2014 | Halageri | H04L 63/0815 726/8 |
| 2014/0040999 A1* | 2/2014 | Zhang | H04W 4/60 726/5 |
| 2014/0223527 A1* | 8/2014 | Bortz | H04L 63/0815 726/6 |
| 2015/0188907 A1* | 7/2015 | Khalid | H04L 63/0815 726/8 |
| 2015/0312236 A1* | 10/2015 | Ducker | H04L 63/0876 726/4 |
| 2015/0365399 A1* | 12/2015 | Biswas | H04L 63/0815 726/8 |
| 2015/0381580 A1* | 12/2015 | Graham, III | H04L 63/20 713/168 |
| 2016/0134599 A1* | 5/2016 | Ross | H04L 63/0815 713/168 |
| 2017/0006021 A1* | 1/2017 | Karaatanassov | H04L 63/0815 |
| 2017/0026488 A1* | 1/2017 | Hao | H04L 67/60 |
| 2017/0111336 A1* | 4/2017 | Davis | H04L 63/029 |
| 2017/0141926 A1* | 5/2017 | Xu | H04L 9/3297 |
| 2017/0289140 A1* | 10/2017 | Cai | H04L 63/10 |
| 2017/0346807 A1* | 11/2017 | Blasi | H04L 9/3247 |
| 2018/0039771 A1* | 2/2018 | Konstantinov | G06F 21/335 |
| 2018/0075231 A1* | 3/2018 | Subramanian | H04L 63/0807 |
| 2018/0077144 A1* | 3/2018 | Gangawane | H04L 63/102 |
| 2018/0139205 A1* | 5/2018 | Devaney | H04L 63/062 |
| 2018/0234464 A1* | 8/2018 | Sim | H04L 9/3213 |
| 2018/0262496 A1* | 9/2018 | Namboodiri | H04L 9/3247 |
| 2018/0278624 A1* | 9/2018 | Kuperman | H04L 63/10 |
| 2018/0302391 A1* | 10/2018 | Jones | G06F 16/284 |
| 2019/0050551 A1* | 2/2019 | Goldman-Kirst | G06F 21/335 |
| 2019/0103968 A1* | 4/2019 | Srinivasan | H04L 9/0894 |
| 2019/0149576 A1* | 5/2019 | Rajadurai | H04L 63/0823 713/151 |
| 2019/0238598 A1* | 8/2019 | Mohamad Abdul | H04L 63/0807 |
| 2019/0306138 A1* | 10/2019 | Carru | H04L 63/08 |
| 2019/0325129 A1* | 10/2019 | Wang | G06F 21/604 |
| 2019/0372962 A1* | 12/2019 | Maria | H04L 63/108 |
| 2019/0372993 A1* | 12/2019 | Dunjic | H04L 9/3268 |
| 2019/0394042 A1* | 12/2019 | Peddada | H04L 9/0894 |
| 2020/0007531 A1* | 1/2020 | Koottayi | H04L 67/146 |
| 2020/0045065 A1* | 2/2020 | Sanap | H04L 63/1483 |
| 2020/0045140 A1* | 2/2020 | Khemani | H04L 63/0807 |
| 2020/0059360 A1* | 2/2020 | Martynov | H04L 63/08 |
| 2020/0099691 A1* | 3/2020 | Akselrod | H04L 63/083 |
| 2020/0125700 A1* | 4/2020 | Chang | G06F 21/6218 |
| 2020/0228629 A1* | 7/2020 | Li | H04L 41/5019 |

* cited by examiner

CLOUD PLATFORM ACCESS SYSTEM

CROSS REFERENCE TO OTHER APPLICATIONS

This application is a continuation of U.S. patent application Ser. No. 16/177,233 entitled CLOUD PLATFORM ACCESS SYSTEM filed Oct. 31, 2018 which is incorporated herein by reference for all purposes.

BACKGROUND OF THE INVENTION

A multi-tenant database system including an application platform comprises a server system storing and providing access to database data for a plurality of distinct user organizations (e.g., tenants). The database system includes an application server for providing database applications (e.g., applications for processing database data, applications for displaying database data, applications for updating database data, etc.). The application server comprises an application platform for allowing third-party developers (e.g., developers unaffiliated with either the database system provider or the tenant) to develop and provide database applications available to database tenants. Typically a multi-tenant database system including an application platform comprises a plurality of tenant systems storing tenant data as well as a plurality of application servers providing applications. A user accessing the database system must be authenticated for access to the database data and platform applications, creating a problem for controlling access to the plurality of the database servers and application servers.

BRIEF DESCRIPTION OF THE DRAWINGS

Various embodiments of the invention are disclosed in the following detailed description and the accompanying drawings.

DETAILED DESCRIPTION

Figure 1:
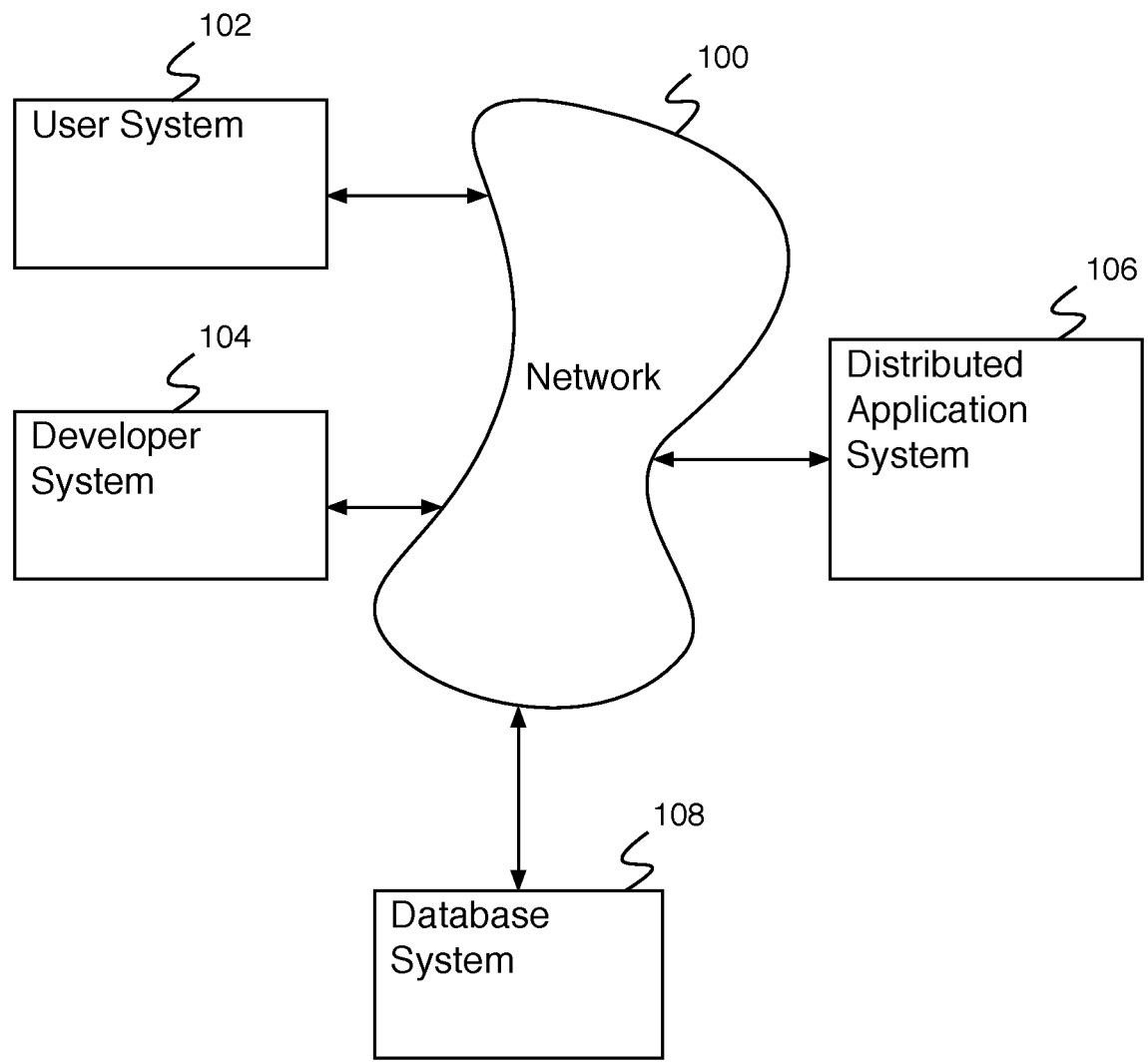
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for gaining secure access comprises an interface configured to receive a first request for access, and a tenant authentication processor configured to provide a tenant token request to a tenant process associated with the first request, receive a tenant token from the tenant process, determine a signed tenant token based at least in part on the tenant token and a key, and provide the signed tenant token for access to an application routing platform. The system for gaining secure access additionally comprises an application routing processor of the application routing platform configured to receive an API call comprising the signed tenant token, determine that the signed tenant token is valid, determine an application platform token, determine routing information to an application platform based at least in part on the API call, and provide the application platform the API call and the application platform token using the routing information to gain access to the application platform.

A system for gaining secure access comprises a system for authenticating a user associated with a tenant and providing access for the user to an application platform. The system for secure access comprises a distributed application system including a platform system. When a user accesses the distributed application system the access is initially received by the platform system. The platform system initially routes the user access to a tenant authentication system for coordination of tenant authentication. The tenant authentication system receives tenant identifying information from the user (e.g., user login information, a tenant name, a tenant domain name, a user email address, a tenant code, a user domain, etc.) and routes user access to a tenant system (e.g., of a plurality of tenant systems) associated with the user. The tenant system authenticates the user using a predetermined authentication protocol and in the event the user is authenticated, provides an indication (e.g., comprising an authentication token) that the user is authenticated to the tenant authentication system. The tenant authentication system generates a signed authentication token and provides the signed authentication token to the platform system. In some embodiments, the response returned comprises a 'code'. The platform system needs to call back to the Tenant Authentication System to get the signed authentication token. In some embodiments, the call back to get the signed authentication token is done per the OAuth 2 standard. In some embodiments, the format of the signed authentication token is a JavaScript Object notation (JSON) web token (JWT) with the tenant name or identifier as a claim in the JWT to use for later routing by the Application Routing System. The user is then authenticated to utilize the platform system to make requests, access data, etc. When the user provides an API call to the platform system, the platform system forwards the API call associated with the signed authentication token to an application routing system. The application routing system verifies the token and determines an application system of a set of application systems based at least in part on the API request (e.g., the application system configured to execute the API request). The application routing system provides the API request along with the token to the determined application system. The application system validates the request, executes the API request, and provides the result to the requesting user via the application routing system.

The system for gaining secure access improves the distributed computing system by providing a centralized authentication system for a platform system including a plurality of tenants and a plurality of application providers. The user is authenticated by its associated tenant system and gains access to the application system or systems it is credentialed for without the application systems being required to authenticate the user directly. This makes a system faster or more efficient to address user access requests.

FIG. 1 is a block diagram illustrating an embodiment of a network system. In some embodiments, the network system of FIG. 1 comprises a network system for a system for gaining secure access. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, developer system 104, distributed application system 106, and database system 108 communicate via network 100. User system 102 comprises a user system for use by a user. User system 102 stores and/or accesses data on database system 108. A user uses a user system 102 to interact with database system 108—for example to store database data, to request database data, to create a report based on database data, to create a document, to access a document, to execute a database application, etc. A user comprises a user associated with a database tenant (e.g., a customer of database system 108 and/or distributed application system 106). Developer system 104 comprises a developer system for use by a developer. A developer utilizes developer system 104 to develop code—for example, database applications for execution by database system 108. In some embodiments, a developer utilizing developer system 104 to develop database applications for execution by database system 108 comprises a third-party developer (e.g., a developer not associated with either the database system provider or the user system organization). Distributed application system 106 comprises a system for providing access to a set of applications developed by a set of developers to a set of users associated with a set of tenants. For example, distributed application system 106 comprises a system for authenticating users to access one or more application servers. In some embodiments, distributed application system 106 and database system 108 comprise a single system.

For example, distributed application system 106 comprises a system for receiving a first request for access, providing a tenant token request to a tenant process associated with the first request, receiving a tenant token from the tenant process, determining a signed tenant token based at least in part on the tenant token and a key, and providing the signed tenant token for access to an application routing platform. For example, distributed application system 106 additionally comprises a system for receiving an API (e.g., application programming interface) call comprising the signed tenant token, determining that the signed tenant token is valid, determining an application platform token, determining routing information to an application platform based at least in part on the API call, and providing the application platform the API call and the application platform token using the routing information to gain access to the application platform.

Figure 2:
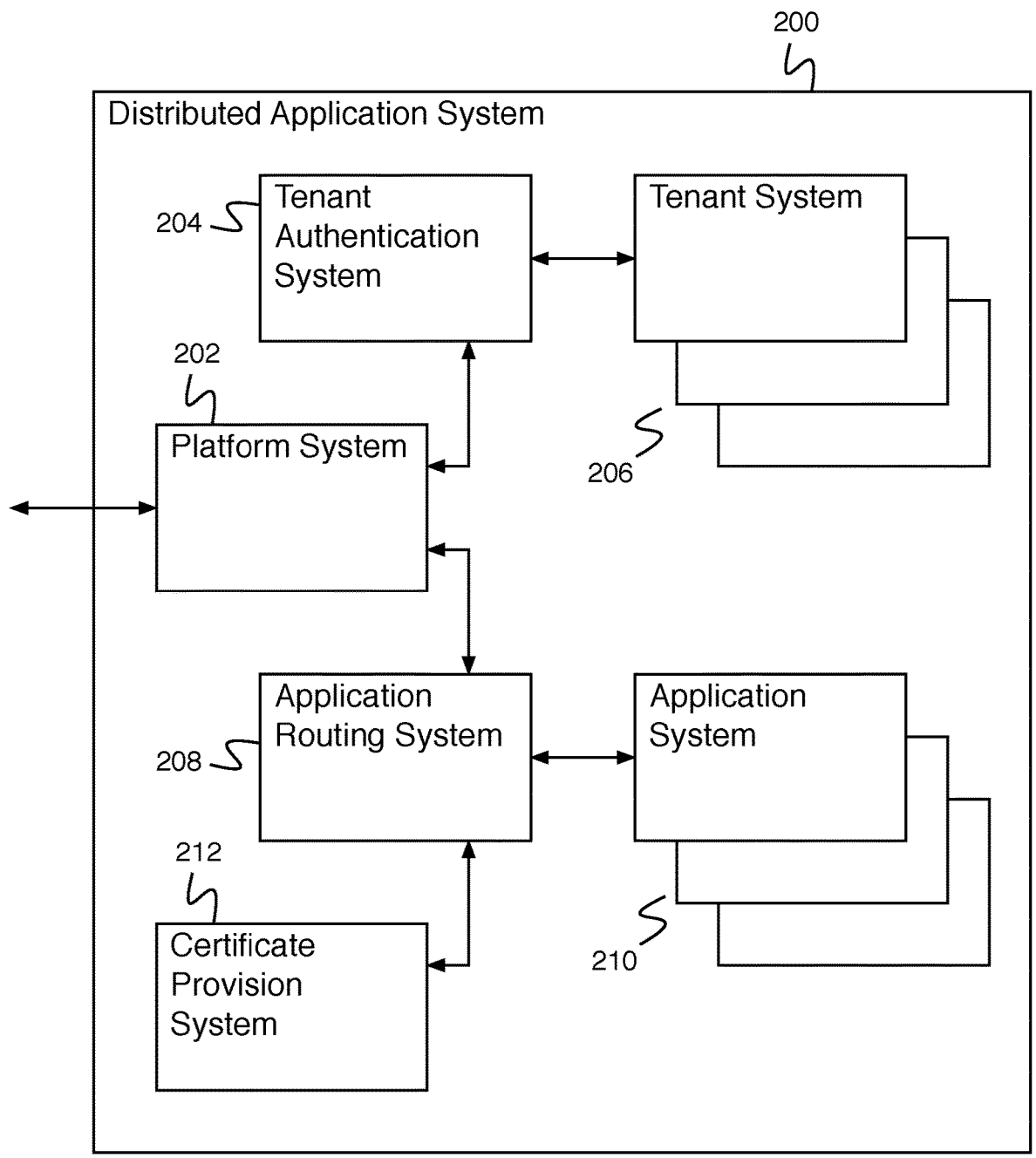
FIG. 2 is a block diagram illustrating an embodiment of a distributed application system.

FIG. 2 is a block diagram illustrating an embodiment of a distributed application system. In some embodiments, distributed application system 200 comprises distributed application system 106 of FIG. 1. In the example shown, distributed application system 200 comprises platform system 202. Platform system 202 comprises a system for communicating with a user system via a network. For example, platform system 202 comprises a system for determining that a user system has not been authenticated and directing the user system to tenant authentication system 204 for authentication. Platform system 202 additionally comprises a system for determining that an API request from a user system has been authenticated and directing the API request to application routing system 208. Platform system 202 comprises an interface configured to receive a first request for access. Tenant authentication system 204 comprises a system for coordinating tenant authentication. Tenant authentication system 204 comprises a tenant authentication processor configured to provide a tenant token request to a tenant process associated with the first request, receive a tenant token from the tenant process, determine a signed tenant token based at least in part on the tenant token and a key, and provide the signed tenant token for access to application routing system 208. In some embodiments, tenant authentication system 204 comprises a virtual tenant authentication system. Tenant systems 206 comprise tenant system for executing a tenant process. For example, tenant systems 206 comprises a plurality of tenant systems (e.g., 2 tenant systems, 10 tenant systems, 122 tenant systems, etc.). Each tenant system hosts one or more tenants and one or more tenant processes. A tenant process comprises a process for receiving tenant information, authenticating the tenant information, and providing an tenant token for authenticating the tenant. When tenant authentication system 204 receives tenant information from platform system 202, tenant authentication system 204 determines which tenant system of tenant systems 206 the tenant information is associated with (e.g., using user login information, a user domain, a tenant domain name, a user email address, a tenant identifier, etc.) and directs the tenant token request to the appropriate tenant. Tenant systems of tenant systems 206 comprise physical systems, virtual systems, containerized systems, etc.

When platform system 202 receives an authenticated API request from a user system (e.g., including a signed tenant token generated by tenant authentication system 204), platform system 202 provides the request to application routing system 208. In some embodiments, the platform system is the same as the webapp, authored by a 3rd party; there is not a user system utilizing the platform system, instead there is just a user with a user agent (web browser), using the platform system (webapp). In some embodiments, the platform system holds the signed token for the user, and the user is tracked by the platform system in some other way (e.g., using a cookie). Application routing system 208 comprises a system for routing an API request to an application system. Application routing system 208 comprises an application routing processor configured to receive an API call comprising a signed tenant token, determine that the signed tenant token is valid, determine an application platform token, determine routing information to an application platform based at least in part on the API call, and provide the application platform the API call and the application platform token using the routing information to gain access to the application platform. In some embodiments, application routing system 208 comprises a virtual application routing system. For example, application routing system 208 determines an application system of application systems 210 for routing the API call based at least in part on the API call. For example, the application system comprises an application platform. In some embodiments, the application system comprises a virtual application system. The application system comprises the application system associated with the application for performing the API call, the least loaded application system associated with the application for performing the API call, the application system associated with the calling client system tenant and associated with the application for performing the API call, etc. The application system of application systems 210 receives the API call, determines that an associated application platform token is valid, performs the API call to determine API call results, and provides the API call results to a user via application routing system 208.

Distributed application system 200 additionally comprises certificate provision system 212 for generating a root certificate. Certificate provision system 212 generates the root certificate one time. On each new provision of application routing system 208, certificate provision system 212 generates a new entity certificate from the root certificate and provides the entity certificate and private key to application routing system 208. In some embodiments, the root certificate is deployed widely to be useful. In some embodiments, the root private key never leaves certificate provisioning system so that security of the solution is not compromised. Application routing system 208 associates the root certificate with an application platform token received by application routing system 208 associated with an API call. In some embodiments, there are two levels involved in associating the root certificate with the application platform token: 1) Application Routing System 208 has a certificate, which chains to the trusted root certificate, and 2) when an application platform token is sent from application routing system 208 to application systems 210, the token is signed with an entity certificate that chains to the root. This allows rotation of the entity certificate without changing the root certificate that all the downstream application systems 210 trust. The determined application system of application systems 210 receives the root certificate associated with the application platform token and validates the application platform token via a signature that chains up to the trusted root certificate. In some embodiments, tenant authentication system 204 comprises a tenant authentication processor and application routing system 208 comprises an application routing processor, wherein the tenant authentication processor and the application routing processor comprise separate processors. In some embodiments, tenant authentication system 204 comprises a tenant authentication processor and application routing system 208 comprises an application routing processor, wherein the tenant authentication processor and the application routing processor comprise a single processor.

Figure 3:
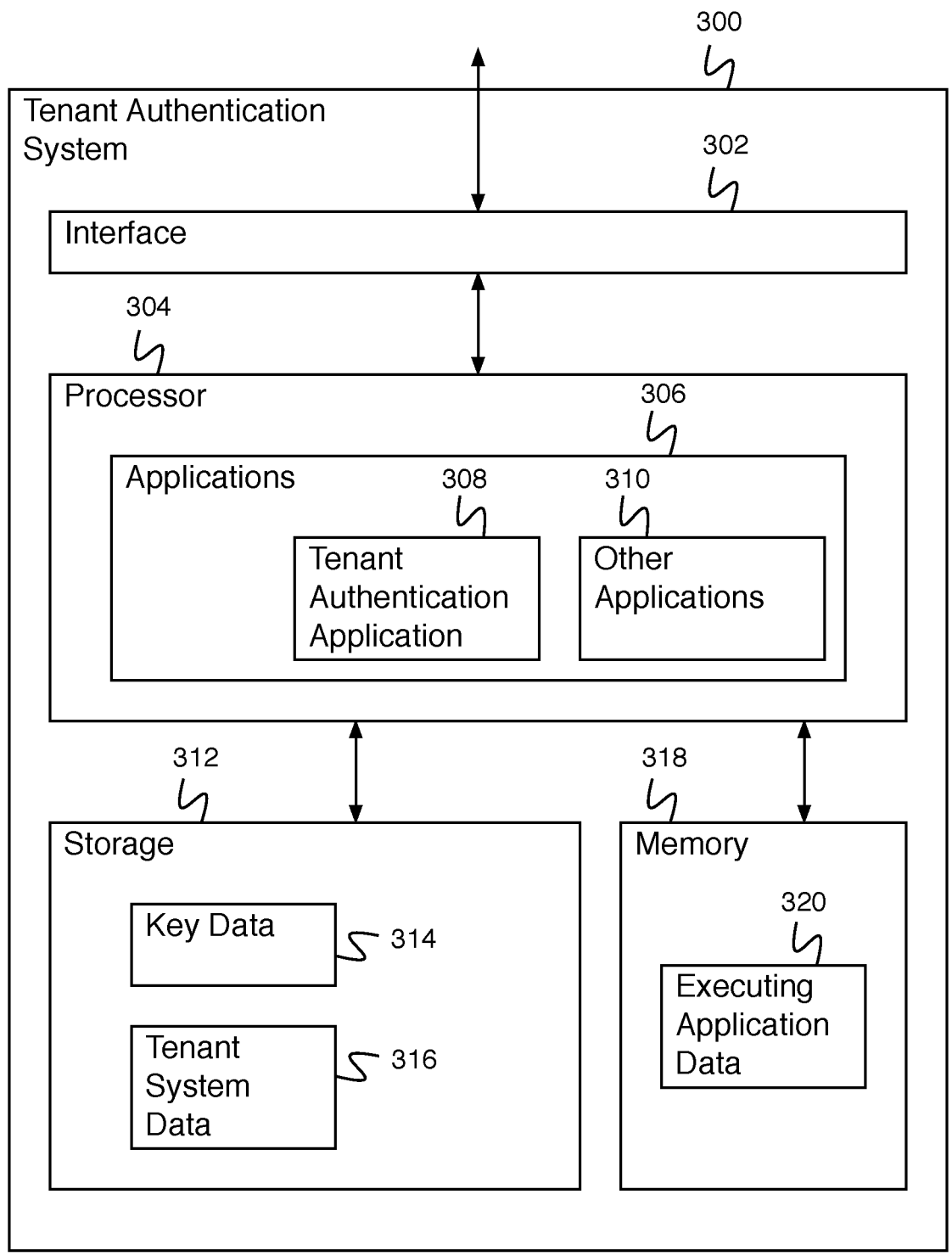
FIG. 3 is a block diagram illustrating an embodiment of a tenant authentication system.

FIG. 3 is a block diagram illustrating an embodiment of a tenant authentication system. In some embodiments, tenant authentication system 300 of FIG. 3 comprises tenant authentication system 204 of FIG. 2. In the example shown, tenant authentication system 300 comprises interface 302. Interface 302 comprises an interface for communicating with external systems using a network. For example, interface 302 comprises an interface for communicating with a user system (e.g., for receiving a first request for access, for receiving an authentication request, for receiving user information—for example, a domain name, an email address, an identifier, etc.). Processor 304 comprises a processor for executing applications 306. Applications 306 comprises tenant authentication application 308 and other applications 310. For example, tenant authentication application 308 determines a tenant system, provides a tenant token request to a tenant process executed by the tenant system, receives a tenant token from the tenant process, determines a signed tenant token based at least in part on the tenant token and a key, and provides the signed tenant token for access to an application routing platform. Other applications 310 comprises any other appropriate applications (e.g., a communications application, a chat application, a web browser application, a document preparation application, a data storage and retrieval application, a user interface application, a data analysis application, etc.). Tenant authentication system 300 additionally comprises storage 312. Storage 312 comprises key data 314 (e.g., comprising key data for determining a signed tenant token based at least in part on a tenant token and a key) and tenant system data 316 (e.g., for determining a tenant system for authentication based at least in part on user information). For example, key data 314 comprises a daily key, an hourly key, a weekly key, a key associated with a tenant, a universal key, etc. Tenant authentication system 300 additionally comprises memory 318. Memory 318 comprises executing application data 320 comprising data associated with applications 306.

Figure 4:
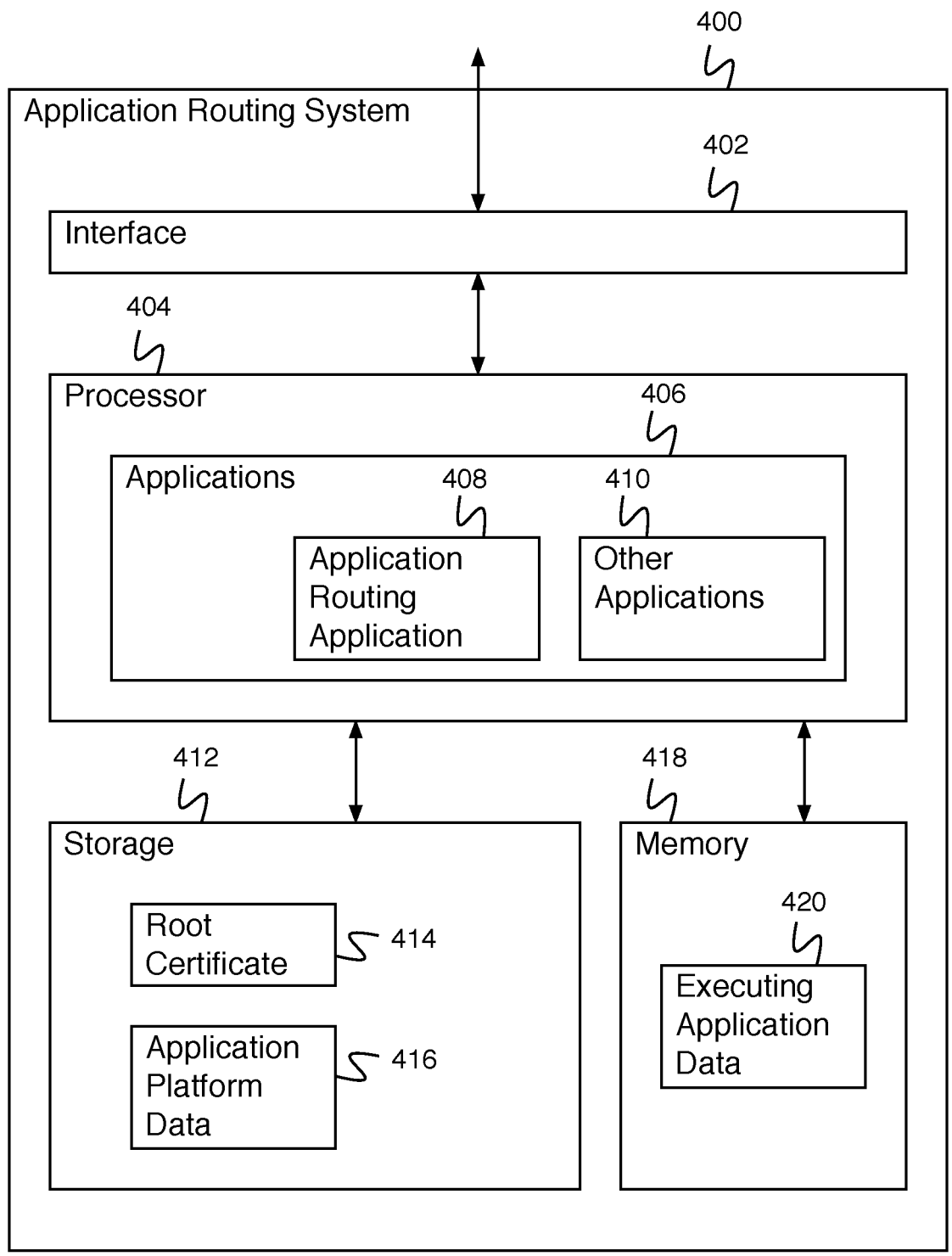
FIG. 4 is a block diagram illustrating an embodiment of an application routing system.

FIG. 4 is a block diagram illustrating an embodiment of an application routing system. In some embodiments, application routing system 400 of FIG. 4 comprises application routing system 208 of FIG. 2. In the example shown, application routing system 400 comprises interface 402. Interface 402 comprises an interface for communicating with external systems using a network. For example, interface 402 comprises an interface for communicating with a user system (e.g., for receiving an API call comprising a signed tenant token, etc.). Processor 404 comprises a processor for executing applications 406. Applications 406 comprises application routing application 408 and other applications 410. For example, application routing application 408 receives an API call comprising a signed tenant token, determines that the signed tenant token is valid, determines an application platform token, determines routing information to an application platform based at least in part on the API call, and provides the application platform the API and the application platform token using the routing information to gain access to the application platform. Other applications 410 comprises any other appropriate applications (e.g., a communications application, a chat application, a web browser application, a document preparation application, a data storage and retrieval application, a user interface application, a data analysis application, etc.). Application routing system 400 additionally comprises storage 412. Storage 412 comprises root certificate 414 (e.g., comprising one or more root certificates received from a certificate provision system) and application platform data 416 (e.g., for determining routing information to an application platform based at least in part on an API call). Note that that application routing system 400 stores an Entity Certificate (signed by the Root Private Key), and a Private Key that goes with that Entity Certificate so that it can use that key to sign Application Platform Tokens. Application routing system 400 additionally comprises memory 418. Memory 418 comprises executing application data 420 comprising data associated with applications 406.

Figure 5:
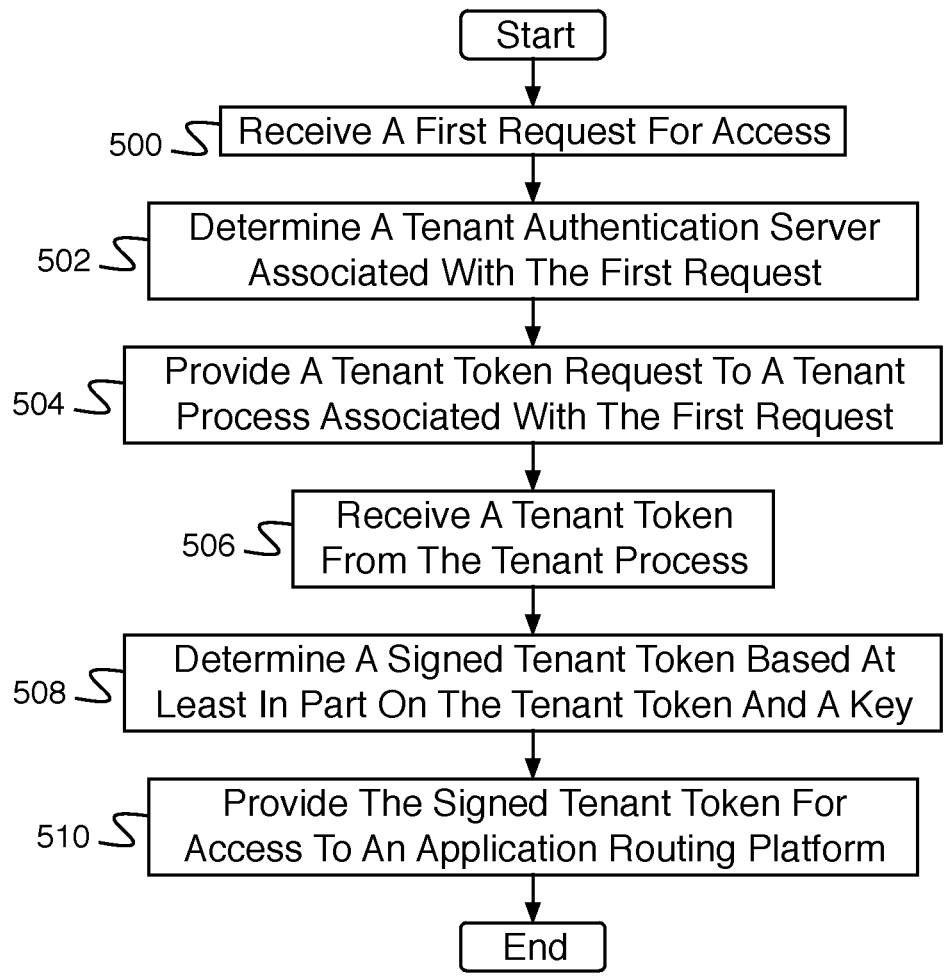
FIG. 5 is a flow diagram illustrating an embodiment of a process for a tenant authentication system.

FIG. 5 is a flow diagram illustrating an embodiment of a process for a tenant authentication system. In some embodiments, the process of FIG. 5 is executed by tenant authentication system 204 of FIG. 2. In the example shown, in 500, a first request for access is received (e.g., from a user system). In 502, a tenant authentication server associated with the first request is determined. In 504, a tenant token request is provided to a tenant process associated with the first request. In 506, A tenant token is received from the tenant process. In 508, a signed tenant token is determined based at least in part on the tenant token and the key. For example, the signed tenant token comprises a new token that is generated. The tenant token that came back from the tenant process is not signed. The Tenant Authentication System validates the token from the tenant, gathers additional information about the User who logged into the tenant, and then generates a secondary JWT token, which includes information about the tenant the token belongs to using a key/signature that the Application Routing Platform will trust. In 510, the signed tenant token is provided for access to an application routing platform.

Figure 6:
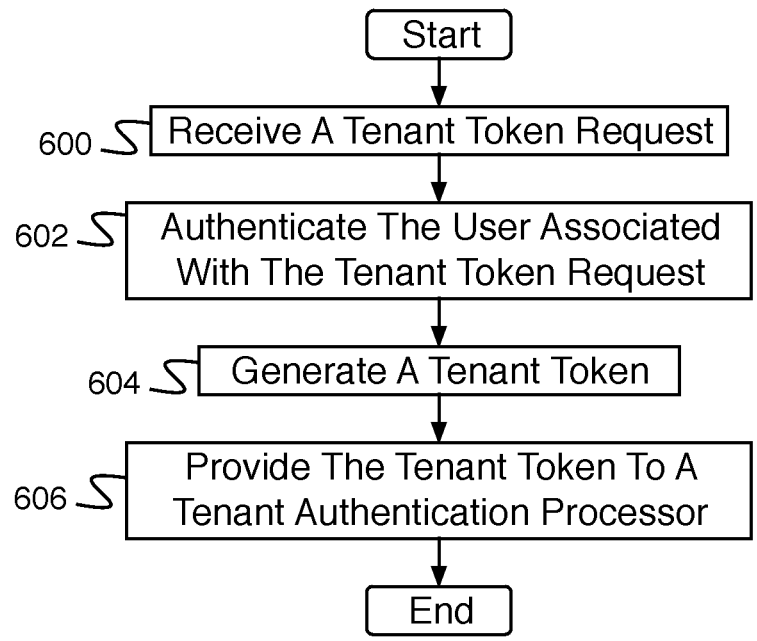
FIG. 6 is a flow diagram illustrating an embodiment of a process for a tenant process.

FIG. 6 is a flow diagram illustrating an embodiment of a process for a tenant process. In some embodiments, the process of FIG. 6 is executed by a tenant system (e.g., a tenant system of tenant systems 206 of FIG. 2) in response to a tenant token request. In the example shown, in 600, a tenant token request is received. In 602, the user associated with the tenant token request is authenticated (e.g., using a username and password, using a security assertion markup language request, etc.). In 604, a tenant token is generated. In 606, the tenant token is provided to a tenant authentication processor.

Figure 7:
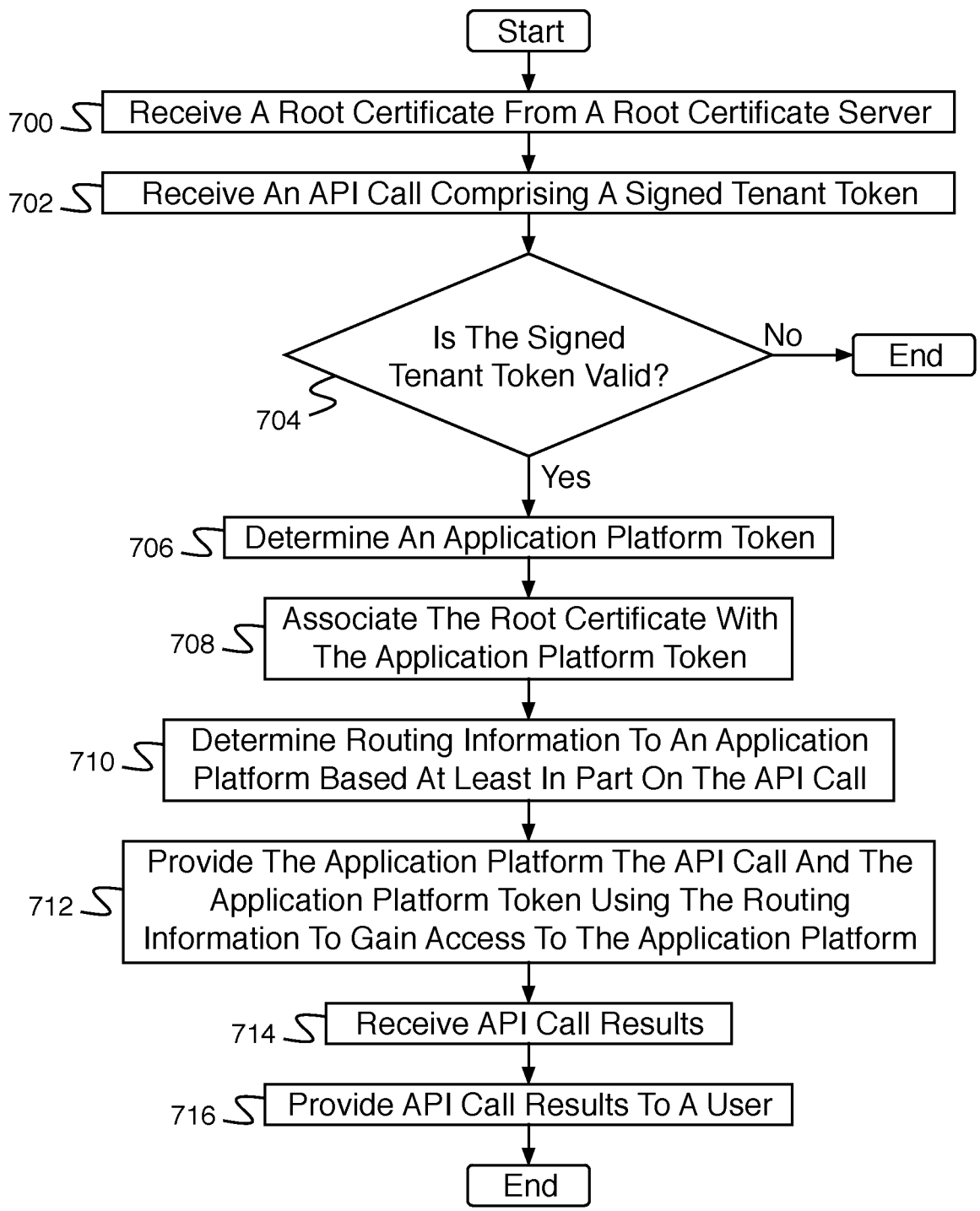
FIG. 7 is a flow diagram illustrating an embodiment of a process for an application routing system.

FIG. 7 is a flow diagram illustrating an embodiment of a process for an application routing system. In some embodiments, the process of FIG. 7 is executed by application routing system 210 of FIG. 2. In the example shown, in 700, a root certificate is received from a root certificate server. In 702, an API call comprising a signed tenant token is received. In 704, it is determined whether the signed tenant token is valid. In the event it is determined that the signed tenant token is not valid, the process ends. In the event it is determined that the signed tenant token is valid, control passes to 706. In 706, an application platform token is determined. In 708, the root certificate is associated with the application platform token. For example, a certificate provision system generates the root certificate one time. On each new provision of an application routing system, the certificate provision system generates a new entity certificate from the root certificate and provides the entity certificate and private key to the application routing system. In some embodiments, the root private key never leaves the certificate provisioning system. In some embodiments, there are two levels involved in associating the root certificate with the application platform token: 1) an application routing system has a certificate, which chains to the trusted root certificate, and 2) when an application platform token is sent from an application routing system to application systems, the token is signed with an entity certificate that chains to the root. This allows rotation of the entity certificate without changing the root certificate that all the downstream application systems trust. In 710, routing information to an application platform is determined based at least in part on the API call. In 712, the process provides the application platform the API call and the application platform token using the routing information to gain access to the application platform. In 714, API call results are received. In 716, the API call results are provided to a user.

Figure 8:
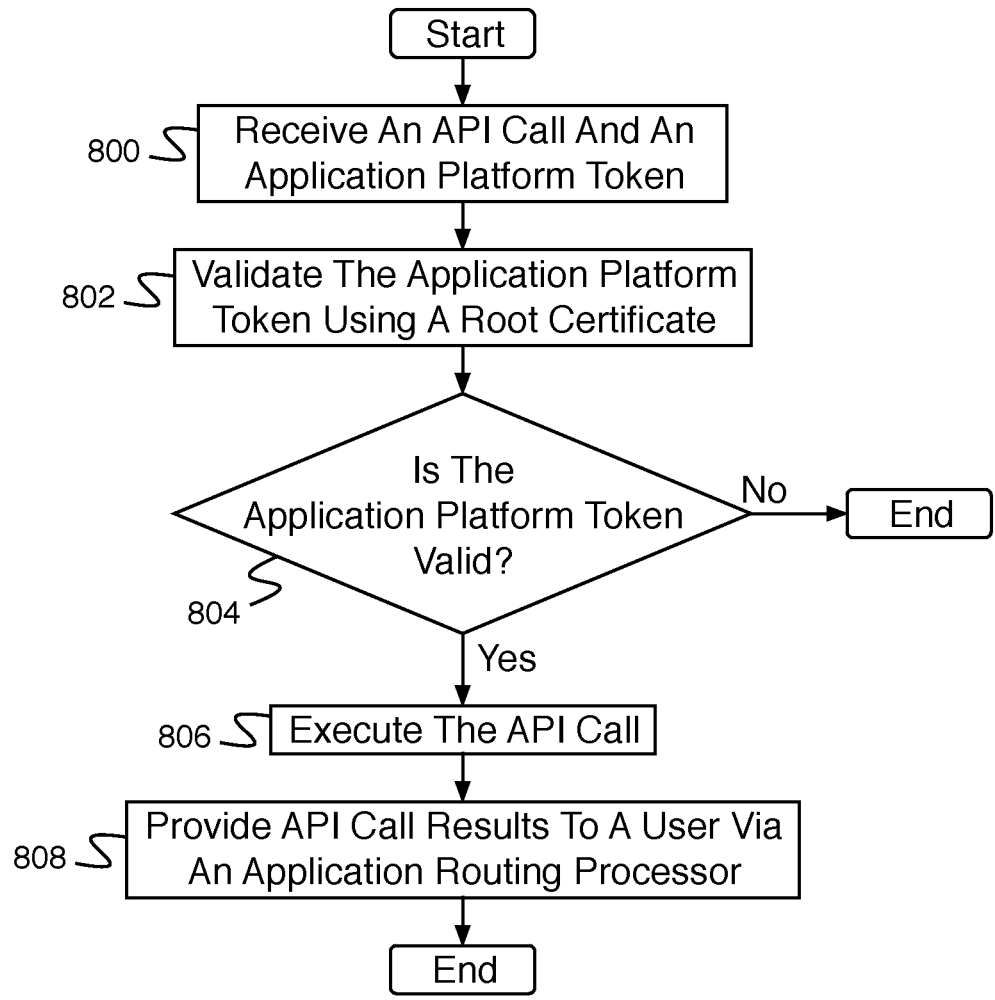
FIG. 8 is a flow diagram illustrating an embodiment of a process for an application system.

FIG. 8 is a flow diagram illustrating an embodiment of a process for an application system. In some embodiments, the process of FIG. 8 is executed by an application system of application systems 210 of FIG. 2. In the example shown, in 800, an API call and an application platform token are received. In 802, the application platform token is validated using a root certificate. In 804, is determined whether the application platform token is valid. For example, whether the validation of 802 was successful and making sure that the application platform token is targeted for the tenant in question. In the event it is determined that the application platform token is not valid, the process ends. In the event it is determined that the application platform token is valid, control passes to 806. In 806, the API call is executed. In 808, API call results are provided to a user via an application routing processor.

Figure 9:
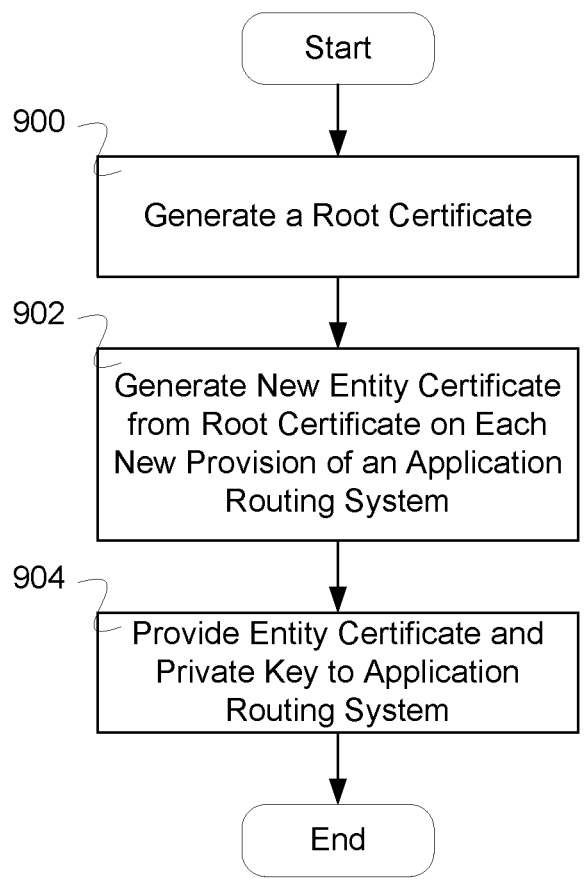
FIG. 9 is a flow diagram illustrating an embodiment of a process for a certificate provision system.

FIG. 9 is a flow diagram illustrating an embodiment of a process for a certificate provision system. In some embodiments, the process of FIG. 9 is executed by certificate provision system 212 of FIG. 2. In the example shown, in 900, a root certificate is generated. For example, a root certificate is generated one time. In 902, a new entity certificate is generated from the root certificate on each new provision of an application routing system. In 904, the entity certificate and private key are provided to the application routing system.

Figure 10:
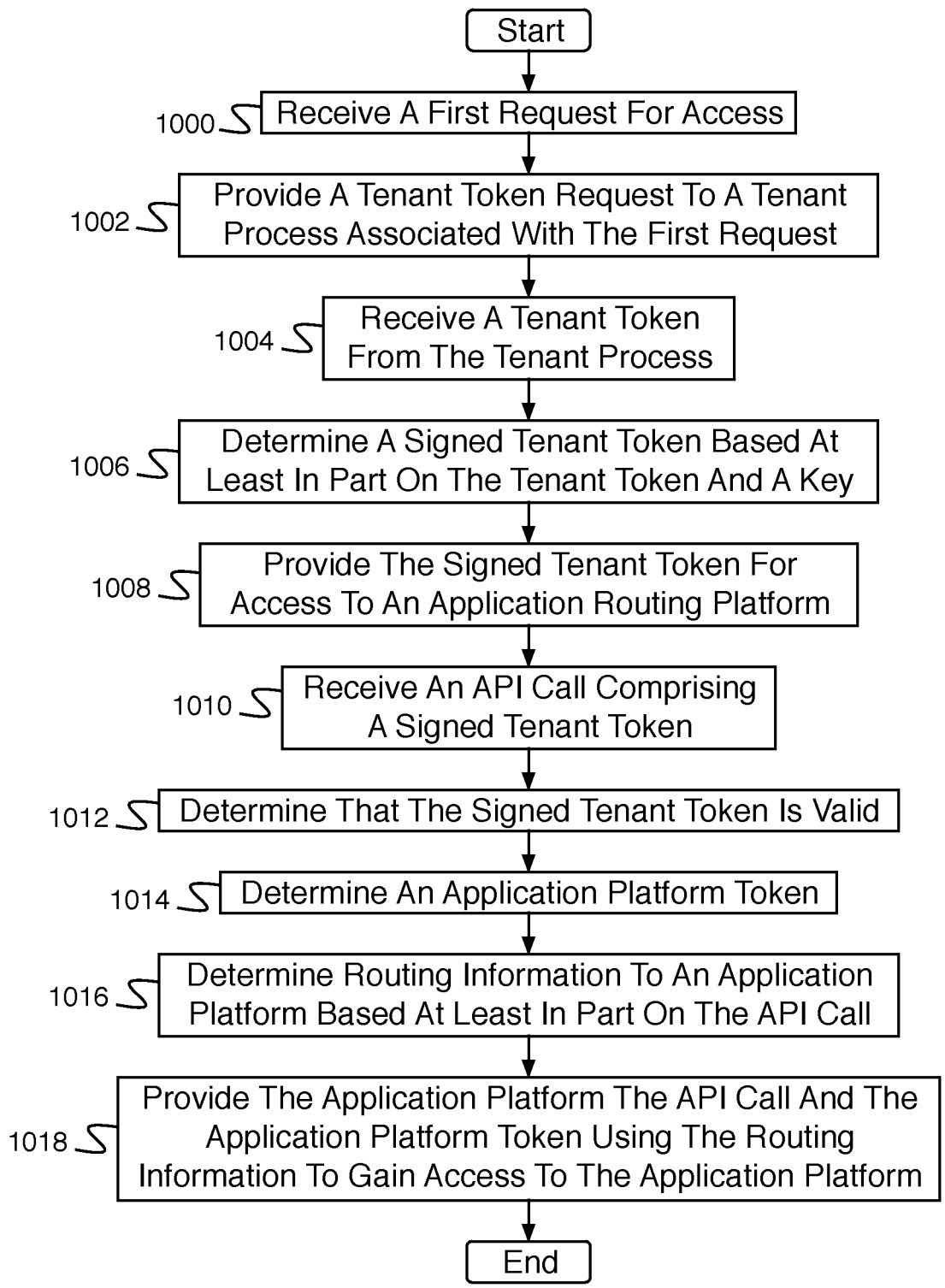
FIG. 10 is a flow diagram illustrating an embodiment of a process for gaining secure access.

FIG. 10 is a flow diagram illustrating an embodiment of a process for gaining secure access. In some embodiments, the process of FIG. 10 is executed by distributed application system 106 of FIG. 1. In the example shown, in 1000, a first request for access is received. In 1002, a tenant token request is provided to a tenant process associated with the first request. For example, the tenant token request is provided to a tenant process based on determining which tenant the user belongs to. In 1004, a tenant token is received from the tenant process. In 1006, a signed tenant token is determined based at least in part on the tenant token and the key. In 1008, the signed tenant token is probed for access to an application routing platform. In 1010, an API call is received comprising a signed tenant token. In 1012, it is determined that the signed tenant token is valid. In 1014, an application platform token is determined. In 1016, routing information to an application platform is determined based at least in part on the API call. In 1018, the application platform is provided the API call and the application platform token using the routing information to gain access to the application platform.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for gaining secure access, comprising:
an interface configured to
receive, at an application routing platform, an API call for an application platform comprising a signed tenant token;
a hardware processor configured to:
determine that the signed tenant token is valid;
determine an application platform token for the application platform;
associate a root certificate with the application platform token;
determine routing information to the application platform based at least in part on the API call; and
provide the application platform the API call and the application platform token using the routing information to enable access to the application platform, wherein the application platform determines whether the application platform token is valid using the root certificate and executes the API call in response to a determination that the application platform token is valid.

2. The system of claim 1, wherein a new entity certificate is generated from the root certificate on each new provision of an application routing system.

3. The system of claim 2, wherein the new entity certificate and a private key are provided to the application routing system.

4. The system of claim 1, wherein a tenant authentication processor is configured to determine a tenant authentication server associated with the request and the signed tenant token.

5. The system of claim 4, wherein the tenant authentication server is determined based at least in part on user login information, a user email address, or a user domain.

6. The system of claim 5, wherein the tenant authentication server comprises a virtual tenant authentication server.

7. The system of claim 1, wherein a tenant process determines a tenant token, wherein determining the tenant token comprises authenticating a user and generating the tenant token.

8. The system of claim 7, wherein authenticating the user comprises authenticating the user using a username and password authentication or a security assertion markup language authentication.

9. The system of claim 1, wherein the application routing platform is part of an application routing system.

10. The system of claim 9, wherein the application routing system comprises a virtual application routing system.

11. The system of claim 1, wherein the application platform determines whether the platform token is valid without authenticating the user.

12. The system of claim 1, wherein the root certificate is received by the application platform from the application routing platform associated with the application platform token.

13. The system of claim 1, wherein the application routing platform receives the root certificate from a certificate provision server.

14. The system of claim 1, wherein the application platform provides API call results via the application routing processor.

15. The system of claim 1, wherein the application platform comprises a virtual application system.

16. The system of claim 1, wherein the signed tenant token is determined based at least in part on a tenant token and a key.

17. The system of claim 16, wherein the tenant token is received from a tenant process.

18. The system of claim 16, wherein the key comprises a daily key.

19. A method for gaining secure access, comprising:
receiving, at an application routing platform, an API call for an application platform comprising a signed tenant token;
determining, using a processor, that the signed tenant token is valid;
determining an application platform token for the application platform;
associating a root certificate with the application platform token;
determining routing information to the application platform based at least in part on the API call; and
providing the application platform the API call and the application platform token using the routing information to enable access to the application platform, wherein the application platform determines whether the application platform token is valid using the root certificate and executes the API call in response to a determination that the application platform token is valid.

20. A computer program product for gaining secure access, the computer program product being embodied in a non-transitory computer readable storage medium and comprising computer instructions for:
receiving, at an application routing platform, an API call for an application platform comprising a signed tenant token;
determining, using a processor, that the signed tenant token is valid;
determining an application platform token for the application platform;
associating a root certificate with the application platform token;
determining routing information to the application platform based at least in part on the API call; and
providing the application platform the API call and the application platform token using the routing information to enable access to the application platform, wherein the application platform determines whether the application platform token is valid using the root certificate and executes the API call in response to a determination that the application platform token is valid.

* * * * *